Jan. 2, 1951  T. F. BAILY  2,536,020
METHOD OF MAKING SILVERY IRON FROM BLACKBAND ORE
Filed Nov. 15, 1947
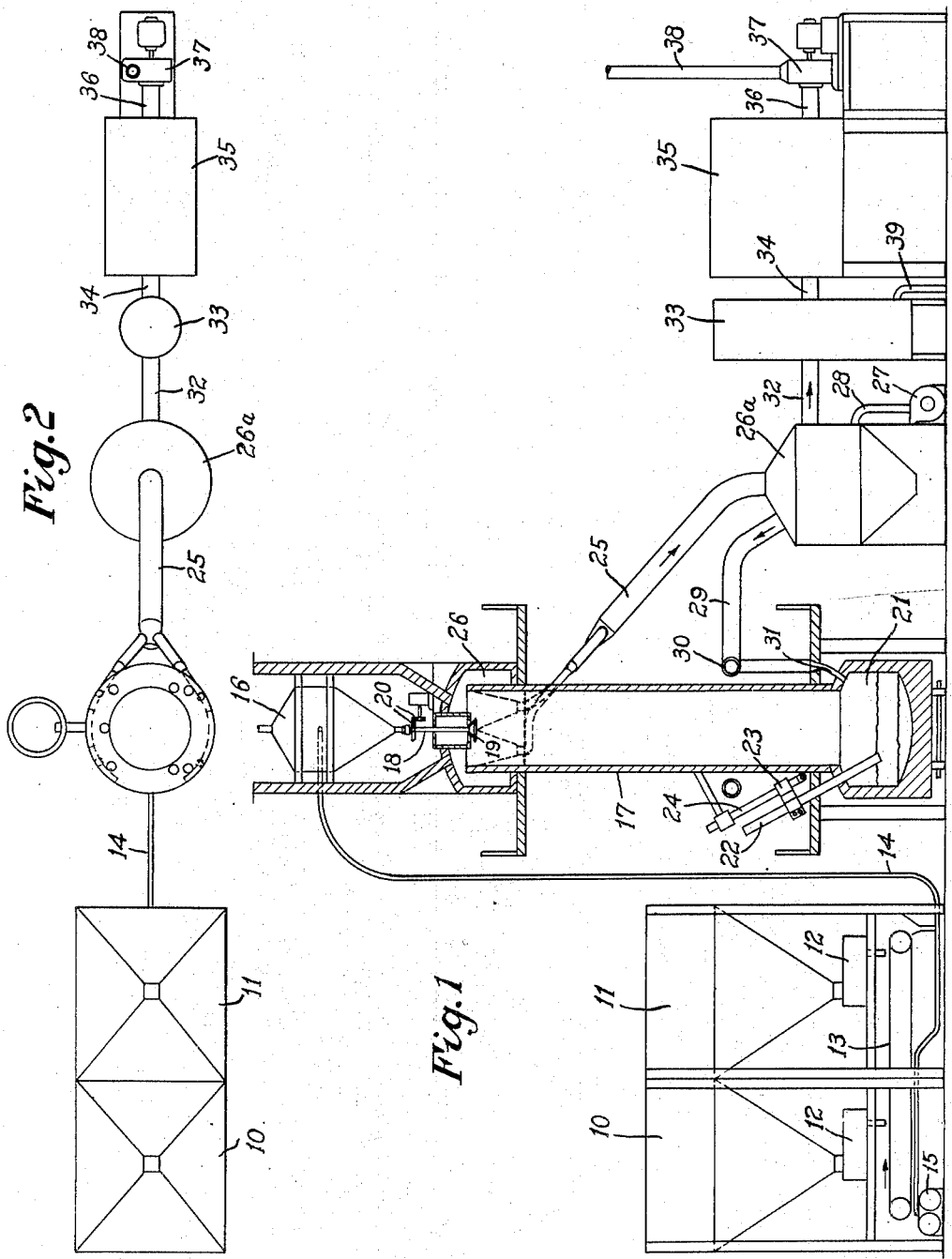
Inventor
Thaddeus F. Baily
By Freaer and Bishop
Attorneys Patented Jan. 2, 1951

2,536,020

UNITED STATES PATENT OFFICE 2,536,020

METHOD OF MAKING SILVERY IRON FROM BLACKBAND ORE

Thaddeus F. Baily, Canton, Ohio

Application November 15, 1947, Serial No. 786,309

3 Claims. (Cl. 75—11)

The invention relates to a method of reducing iron ores to produce ferrous alloys, and more particularly to the reduction of iron ores containing silica and carbonaceous material, such as the blankband ores of northeastern Ohio, wherein the carbonaceous material of the ore is utilized in the reduction of the iron and other metallic oxides of the ore, producing ferrous alloys such as silvery iron containing from 6% to 25% or more of silicon.

These blackband ores of northeastern Ohio are classed as carbonate ores and contain from about 22% to 30% iron, from about 5% to 25% silica, and fixed carbon in the amount of from 10% to 20%, as well as hydrogen, hydrocarbon gases and other volatiles which distill off readily at temperatures of about 500° F., and constitute valuable by-products.

An analysis of a typical blackband ore is as follows:

| Ore constituents: | Per cent |
|---|---|
| Fe | 26.50 |
| $O_2$ | 7.60 |
| $CO_2$ | 20.70 |
| $SiO_2$ | 13.50 |
| $Al_2O_3$ | 5.00 |
| MnO | 1.20 |
| CaO | .60 |
| MgO | .80 |
| $P_2O_5$ | .40 |
| Coal constituents: | |
| C | 18.41 |
| $H_2$ | 1.79 |
| $H_2O$ | 1.16 |
| N | .30 |
| S | .70 |
| Bal | 1.34 |
| | 100.00 |

Such blackband ores were used in the early charcoal and coke blast furnaces of northeastern Ohio for the production of pig iron. However it was necessary to first calcine these ores to remove the volatiles which otherwise would soot up the stack column of the blast furnace and stop the flow of gases through the stack.

This calcining was accomplished by stacking the ore in piles containing upwards of 1000 tons and roasting for about three months to remove all of the carbonaceous material, this calcined ore being then reduced in the blast furnace. Since the calcining operation removed all of the volatiles, as well as all of the original carbonaceous material from the ore, the tar, light oils and other distillates were lost and all of the fuel required for converting the iron of the ore to pig iron had to be supplied in the form of coke or charcoal. Thus all of the fuel value of the ore was wasted and additional fuel was required for smelting the ore.

The present invention contemplates a process of reducing blackband ores and the like in which all of the carbon in the ore is utilized in the reduction operation and the tar, light oils and other distillates which are volatilized may be recovered from the furnace gases as valuable byproducts.

It is therefore an object of the present invention to provide a method of producing ferrous alloys containing silicon, direct from ores containing silica and carbon, by utilizing the carbon in the ore to reduce the iron and other metallic oxides therein.

Another object is to provide such a reduction method in which the volatiles are recovered in the form of tar, light oils and gases.

A further object is to provide a method which consists in dropping such ores through a shaft type electric furnace maintained at sufficient temperature to drive off the gases, the fixed carbon in the ore acting as a reducing agent for the iron and other metallic oxides of the ore, producing an alloy of silicon and iron, or silicon and iron with other metals.

A still further object of the invention is to use such ores without the addition of fuel or flux for the production of silvery iron of the grades from 6% to 25%, the silicon being reduced in the hearth of the furnace by electric heat with the fixed carbon of the ore, while the iron is reduced in the furnace shaft with the CO gases coming from the silicon reduction in the hearth, or formed by combustion of part of the carbon in the ore with preheated air introduced into the bottom of the furnace shaft.

Another object is to provide a method in which, in cases where the blackband ore contains a high percentage of carbonaceous material and a lower silica content than is necessary to produce the desired percentage of silicon in the metal, the additional silica requirement is added in the form of silica rock or sand, or high silica iron ore, such as the mountain ore, or kidney ore of northeastern Ohio or other ore which contain substantially no carbonaceous material.

A further object is to provide such a method in which ore of high manganese content may be added in cases where the manganese content of the blackband ore is not sufficient to produce silvery iron having 1% or more manganese content.

A still further object is to provide a method of producing a metal having a very high silicon content which would require more carbon than would be available from the blackband ore, by charging bituminous shale, such as frequently occurs directly above the blackband ore, which has a very high silica content as well as a high percentage of carbonaceous material, thus furnishing the additional silica and carbon for the production of high silicon metal without the addition of any substantial amount of iron for the charge.

Another object of the invention is to provide a process for making high silicon iron from blackband ore in which the calcination operation is eliminated, and all of the carbon required for the reduction operation is supplied by the ore itself.

The above objects, together with others which will be apparent from the following description, may be attained by carrying out the improved process of producing silvery iron from blackband ore in the manner hereinafter described in detail, reference being had to the drawing in which;

Figure 1 is a sectional elevation of a furnace and associated apparatus adapted to be used in carrying out the process; and, Fig. 2 is a plan view of the apparatus shown in Fig. 1.

The apparatus is shown more or less diagrammatically and may include hoppers, indicated at 10 and 11, one of which is adapted for containing blackband ore, while the other may contain mountain ore, kidney or shell ore, bituminous shale blackband ore of a different analysis, or other material which may be charged with the blackband ore for increasing the silicon content of the metal.

A constant weight feeder 12 is located at the bottom of each of the hoppers for feeding a definite quantity of the ore onto an endless conveyor 13 which discharges the ore into a transport airline 14, provided with a blower 15 for conveying the ore to the feeding head 16 which is located above the furnace shaft 17 and provided with the depending feed tube 18 having a distributor plate 19 connected to and spaced from its lower end, the tube being arranged to be rotated through the gears 20 for uniformly discharging the powdered material over the periphery of the plate or disc 19 into the top of the furnace shaft.

The ore is reduced to powdered condition for carrying out the process, being preferably within a range of 20 mesh to 100 mesh, although the process may be carried out with ore of a particle size either larger or smaller than this range.

The hearth 21 of the furnace is heated electrically by electrodes 22 which may be provided with conventional electrode holders 23 mounted in usual manner upon the masts 24. A duct 25 collects the furnace gases which pass up out of the top of the shaft 17 and are withdrawn from the annular chamber 26 surrounding the same, said duct leading into an air heater and sulphur precipitator indicated at 26a.

The cold blast fan 27 is connected to the air heater and sulphur precipitator by the pipe 28, and a hot blast pipe 29 leads from the air heater and precipitator to the bustle pipe 30, from which tuyères 31 lead to the hearth of the furnace.

The sulphur precipitator may be connected by the pipe 32 with a tar extractor, indicated generally at 33, which communicates through pipe 34 with a Cottrell $P_2O_5$ precipitator, indicated generally at 35, which is connected by pipe 36 with an exhauster 37 from which clean gas is discharged through the pipe 38. Tar extracted in the extractor 33 may be discharged through the pipe 39, together with any condensible silica or alumina compounds, and may be refined.

The blackband ores of northeastern Ohio, which the present invention contemplates using, are classified as carbonate ores and usually contain about 22% to about 30% iron, from about 5% to about 25% of silica and fixed carbon in the amount of from about 10% to about 25%, as well as hydrogen, hydrocarbon gases and other volatiles which distill off readily at temperatures about 500° C. and constitute valuable by-products.

A typical analysis of several examples of blackband ore found in northeastern Ohio are as follows:

| Sample No. | Per Cent Fe | Vol. Matter | $SiO_2$ | $Al_2O_3$ | CaO | MgO | Mn | P | S | C |
|---|---|---|---|---|---|---|---|---|---|---|
| 1 | 29.00 | 40.16 | 10.64 | 6.27 | 2.32 | 1.71 | | .17 | 1.51 | 13.28 |
| 2 | 25.02 | 39.49 | 19.20 | 6.65 | .60 | 1.43 | | .23 | .876 | 15.0 |
| 3 | 24.8 | 38.86 | 14.62 | 7.63 | .78 | 1.18 | .21 | .125 | .86 | 21.45 |
| 4 | 26.4 | ¹40 | 23.7 | 5.70 | .90 | .13 | .60 | .27 | 1.02 | ¹12 |
| 5 | 30.2 | ¹40 | 5.36 | 5.13 | 4.36 | 2.54 | .14 | .18 | .55 | 20.4 |

¹ Estimated.

When these ores are introduced into an electric furnace and brought to a high temperature, the hydrocarbon gases and $CO_2$ of the ore are driven off, and the fixed carbon acts as the reducing agent for the iron and other metallic oxides of the ore, producing an alloy of silicon and iron, or silicon and iron with other metals, such as manganese.

When these blackband ores are processed in a shaft type furnace with an electrically heated hearth, such as shown in the drawing, the ore is preheated in the upper part of the shaft, and the $CO_2$ and hydrocarbon gases are driven off and are withdrawn from the top of the furnace together with the other furnaces gases, through the duct 25.

These gases are put through a by-product recovery system, such as shown in the drawing, for the recovery of the tar, light oils and other condensible vapors or fume.

With this process it is thus possible to use the blackband ore in its natural state, without calcining as was formerly thought necessary, and without the addition of fuel or flux, for the production of silvery iron of the grades of from 6% to 25%, the silicon being reduced in the hearth of the furnace by electric heat with the fixed carbon of the ore, while the iron is reduced in the furnace shaft with the CO gases coming from the silicon reduction in the hearth, or formed by combustion of part of the carbon in the ore with preheated air introduced in the bottom of the shaft of the furnace, through the tuyères 31.

In some cases, for instance in the production of silvery iron with a high percentage of silicon, no air will be admitted at the tuyères, the CO from the silicon reduction in the hearth furnishing sufficient CO for the reduction of the FeO in the shaft; or in cases where electric power is sufficiently inexpensive I may use no air in the shaft, but allow sufficient FeO to be reduced with fixed carbon in the hearth of the furnace, along with the silicon, to provide enough CO for the reduction of the remaining FeO in the shaft of the furnace.

In some cases where the blackband ore contains a high percentage of carbonaceous material and a lower silica content than is necessary to produce the desired percentage of silicon in the metal, I may add the additional silica requirement in the form of silica rock or sand, or I may add high siliceous iron ore, such as the block kidney or shell ore of northeastern Ohio, which contains substantially no carbonaceous material.

A typical analysis of such kidney ore is as follows:

| Fe | $H_2O$ | $SiO_2$ | $Al_2O_3$ | $CaCO_3$ | $MgCO_3$ | $P_2O_5$ | S | Mn |
|---|---|---|---|---|---|---|---|---|
| 35.67 | 11.45 | 30.18 | 2.80 | 1.30 | .76 | .64 | trace | 1.20 |

If a very high silicon content is desired in the metal, which would require more carbon than would be available from the blackband ore alone, I may charge bituminous shale, such as frequently occurs directly above the blackband ore and has a very high silica content, as additional silica and carbon for the production of high silicon metal without the addition of any substantial quantity of iron, which also provides an increased yield of by-products in the form of tar, and light oils.

A typical analysis of such bituminous shale is as follows:

| H | C | N | O | S | $SiO_2$ | $Al_2O_3$ | CaO | MgO | $Fe_2O_3$ | P | Moisture |
|---|---|---|---|---|---|---|---|---|---|---|---|
| 3.5 | 41.0 | .8 | 11.0 | .3 | 28.3 | 11.1 | .6 | .1 | 1.5 | .03 | 1.77 |

This bituminous shale produces 20.4 gallons of tar per net ton of shale and 1490 cubic feet of gas with 531 B. t. u. per cubic foot, its thermal value being 7,090 B. t. u. per pounds of shale.

In many cases blackband ores are of such composition that silvery iron containing from 10% to 25% silicon may be produced without any slag, the alumina and excess silica being volatilized and carried out with the furnace gases from which they may be recovered as alumina and silica compounds. In order to achieve the desired composition in the metal, these ores may be blended to obtain the desired iron-silicon ratio and the desired carbon content in the charge.

A carbonization test run on a typical blackband ore showed a by-product recovery per net ton of ore as follows:

11.6 gallons of tar
1.4 gallons of light oils
4560 cubic feet of 176 B. t. u. gas The carbonized residue amounting to 73.3% of the original weight of the ore contained 15.7% carbon. The thermal value of the ore treated as a low grade coal showed 3379 B. t. u. per pound.

The 15.7% carbon in the residue shows that the raw ore sample contained 11.5% fixed carbon in addition to the carbon driven off with the volatiles. This ore contained 26.5% iron, 10.7% silica and .5% MnO so that 100 pounds of ore would produce 32.3 pounds of 15% silvery iron of the following theoretical analysis:

| | |
|---|---|
| .4# | 1.20% carbon |
| .4# | 1.20% manganese |
| 5.00# | 15.60% silicon |
| 26.50# | 82.00% iron |
| 32.30# | 100.00% |

The carbon required for the reduction of the iron, silicon and manganese is as follows:

$$\underset{34.05\#}{\underset{72}{FeO}} + \underset{5.7\#}{\underset{12}{C}} = \underset{26.5\#}{\underset{56}{Fe}} + \underset{13.25\#}{\underset{28}{CO}}$$

$$\underset{10.7\#}{\underset{60}{SiO_2}} + \underset{4.3\#}{\underset{24}{2C}} = \underset{5\#}{\underset{28}{Si}} + \underset{10\#}{\underset{56}{2\,CO}}$$

$$\underset{.5\#}{\underset{71}{MnO}} + \underset{.084\#}{\underset{12}{C}} = \underset{.388\#}{\underset{55}{Mn}} + \underset{.196\#}{\underset{28}{CO}}$$

5.7#   carbon required for reduction of Fe
4.3#   carbon required for reduction of Si
.084# carbon required for reduction of Mn 10.084# carbon required for reduction
.4 # carbon required in silvery iron (1.2%)

10.484# carbon required

There is therefore one pound of carbon additional per 100 pounds of ore over that required for the complete reduction of this ore to 15% silvery iron in an all-electric reduction operation.

When 200 pounds of this ore was charged into an acid-lined, arc type, electric steel-making furnace 68½ pounds of metal was tapped without the addition of any fuel or flux of the following analysis:

1.18% carbon
15.00% silicon
1.98% manganese
.11% aluminum
.023% sulphur
.360% phosphorus No slag was formed, but a thin blanket of dry black powder covered the metal bath.

It is desirable to have 1% or more manganese in silvery iron, and the manganese content of the ore is usually high enough to supply this requirement. However, if more manganese is desired in the metal, it may be added in the form of ore of high manganese content.

A low sulphur content is also desirable in the metal and this is readily accomplished by volatilization of the sulphur from the ore by heating to a high temperature in the furnace shaft, either in a reducing or oxidizing atmosphere.

There are some cases, for instance, where silvery iron is used in iron foundry operations, where it is desirable to have a high phosphorus content, a premium of $1.00 per ton being paid for a phosphorus content of .75% or higher. This can be accomplished by maintaining the temperature in the lower part of the furnace shaft below 1400° C. or allowing the gases in the lower part of the shaft to contain appreciable quantities of $CO_2$ or $H_2O$, either method preventing the reduction of the phosphorus which then falls to the hearth of the furnace, is reduced with the silicon, and goes into the metal.

However, when a low phosphorus content is desired in the metal, and the ore contains phosphorus in the form of apatite, or some similar phosphorus compound, the temperature in the lower part of the shaft is maintained above 1400° C. and the furnace gases are kept substantially free of $CO_2$ and $H_2O$, under which conditions the phosphorus is reduced and volatilized and carried out of the furnace with the other gases, and may be recovered as phosphoric acid.

By this method it is not only possible to process blackband ores without the necessity of calcining, as was required where these ores were reduced in the blast furnace, but the carbon which was formerly wasted in calcining is used for the reduction of the ore and other metals desired in the finished product. Furthermore, the combustible gases being comparable in analysis and thermal value to blast furnace gas, may be used for fuel, after the by-products such as tar and light oils have been removed.

Although certain examples have been shown above in which a specific analysis of metal is made from a typical blackband ore, such examples are given merely for the purpose of illustration and it is not the intention to limit the invention in any way to such specific cases, the invention residing in the method of reducing the iron and other desired oxides in the ore to metal without first calcining the ore, by making use of the carbonaceous material of the ore for its reduction, and also in the recovery of by-products from the furnace gases.

These blackband ores, which are ordinarily considered to be low grade, are readily and economically processed by my new method utilizing completely substantially all of the constituents of the ore to produce not only a valuable main product but useful by-products.

I claim:

1. The method of producing high silicon iron from blackband ore containing 5% to 25% $SiO_2$ and 10% to 20% carbon, which consists in charging finely divided blackband ore into the top of a shaft type furnace with electrically heated hearth, allowing it to fall freely through the furnace, introducing air at the bottom of the furnace, and burning a portion of the carbon of each ore particle by means of the air forming CO gas in the ore particles for reducing the iron and other metallic oxides in the ore particles.

2. The method of producing high silicon iron from blackband ore containing 5% to 25% $SiO_2$ and 10% to 20% carbon, which consists in charging finely divided blackband ore into the top of a shaft type furnace with electrically heated hearth, allowing it to fall freely through the furnace, introducing air at the bottom of the furnace, and burning a portion of the carbon of each ore particle by means of the air forming CO gas in the ore particles for reducing the iron and other metallic oxides in the ore particles, allowing the partially reduced ore particles, with sufficient carbon remaining in them for reduction of the silicon, to fall to the electrically heated hearth for reduction of the silicon in the ore particles with electric heat.

3. The method of producing high silicon iron from blackband ore containing 5% to 25% $SiO_2$ and 10% to 20% carbon, which consists in charging finely divided blackband ore into the top of a shaft type furnace with electrically heated hearth, allowing it to fall freely through the furnace, introducing air at the bottom of the furnace, and burning a portion of the carbon of each ore particle by means of the air forming CO gas in the ore particles for reducing the iron and other metallic oxides in the ore particles, allowing the partially reduced ore particles, with sufficient carbon remaining in them for reduction of the silicon, to fall to the electrically heated hearth for reduction of the silicon in the ore particles with electric heat, removing the gases from the top of the furnace at a temperature below which the hydrocarbon would react with the $CO_2$ in the gas, cooling the gases for condensation of hydrocarbon gases so that they can be removed in liquid form and removing the metal from the hearth of the furnace.

THADDEUS F. BAILY.

REFERENCES CITED

The following references are of record in the file of this patent:

UNITED STATES PATENTS

| Number | Name | Date |
|---|---|---|
| 513,744 | Uehling | Jan. 30, 1894 |
| 1,106,166 | Testrup et al. | Aug. 4, 1914 |
| 1,557,107 | Trent | Oct. 13, 1925 |
| 2,066,665 | Baily | Jan. 5, 1937 |